Sept. 4, 1956 W. J. STEEN 2,761,920

BAND-PASS LIMITER CIRCUIT

Filed Sept. 30, 1950

*INVENTOR.*
Willis J. Steen

*BY*
Foorman L. Mueller
Atty.

United States Patent Office 2,761,920

Patented Sept. 4, 1956

2,761,920

BAND-PASS LIMITER CIRCUIT

Willis J. Steen, Chicago, Ill., assignor to Motorola, Inc., Chicago, Ill., a corporation of Illinois Application September 30, 1950, Serial No. 187,783

2 Claims. (Cl. 179—171)

This invention relates to limiter circuits and more specifically to the coupling of successive stages of a limiter or like circuit.

For many types of limiter action it is desirable to provide limiting over a wide frequency band involving relatively high frequencies. Limiters as heretofore constructed involve time constant circuits which limit the frequency range and make it impossible to obtain flat response over a wide band.

One of the objects of the invention is to provide a limiter circuit which provides a constant amplitude over an extremely wide frequency range or band.

Another object is to provide a limiter circuit in which time constants are eliminated. This enables the circuit to operate at extremely high frequencies with a flat characteristic.

Still another object is to provide a limiter circuit in which successive stages are coupled through windings which are detuned relative to each other. According to one feature one of the windings is tuned above and the other below the center of the desired frequency band to provide a flat characteristic over the entire band.

According to another feature damping impedances, preferably series and shunt resistors, are connected in circuit with the windings to prevent overshoots, to act as decoupling elements, and to aid in producing the desired constant voltage characteristics.

A specific object is to provide a coupling circuit for successive limiter or like stages which will pass a wide band of frequencies and which is not critical to tube or component changes.

The above and other objects and advantages of the invention will be more readily apparent from the following description when read in connection with the accompanying drawing, in which.

Figure 1:
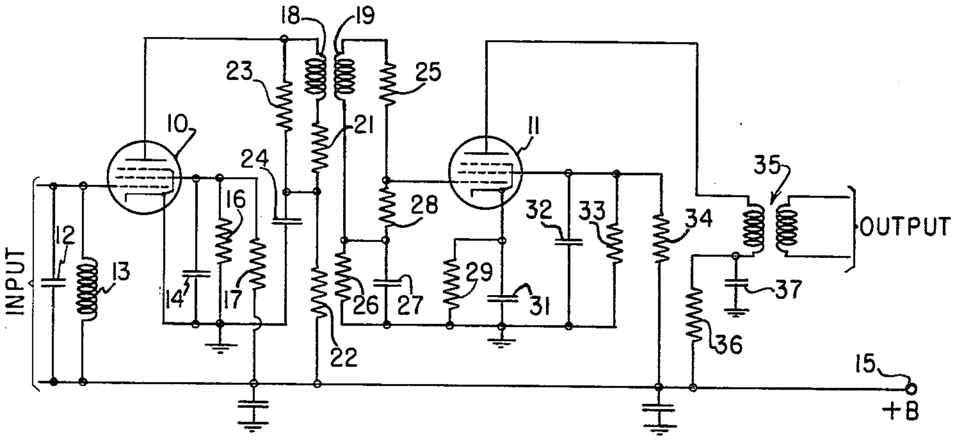
Figure 1 is a circuit diagram of a limiter circuit embodying the invention.

The circuit shown is particularly adapted for use in a high frequency circuit on the order of 100 MC to provide a flat limiter action over a frequency band of about 20 MC. The circuit includes a pair of electron discharge tubes 10 and 11 shown as pentodes, to provide two stages of limiter action. The input signal, which may come from the last intermediate frequency amplifier of a superheterodyne receiver, is applied between the control grid of the first tube 10 and ground. Preferably the input circuit is tuned by a shunt capacitor 12 and a shunt inductor 13. Tuning of the input is not essential but has been found to improve the functioning of the circuit.

The cathode of the tube 10 is connected to the suppressor grid and directly to ground so that the tube operates with zero bias. The screen grid of this tube is connected to ground through a bypass condenser 14 and is connected to ground and to a plus B source indicated at 15 through voltage divider resistors 16 and 17. By properly proportioning the resistors 16 and 17 the screen grid potential can be controlled to balance the cutoff and plate saturation characteristic of the tube 10 so that it will limit symmetrically.

The output circuit of the first tube 10 is connected to the input circuit of the second tube 11 through coupled windings 18 and 19. The plate of the tube 10 is connected through the winding 18 and through a damping resistor 21 and a plate dropping resistor 22 to the plus B source. A second damping resistor 23 is connected across the winding 18 and a by-pass condenser 24 connects the lower ends of the resistors 21 and 23 to ground.

One end of the winding 19 is connected through a damping resistor 25 to the control grid of the tube 11 and the other end is connected through a metering resistor 26 by-passed by a condenser 27 to ground. The resistor is of a few ohms to a few hundred ohms and only provides a means for checking the circuit by connecting a meter across it. A damping resistor 28 shunts the winding 19 and damping resistor 25.

The cathode of the tube 11 is connected to the suppressor grid and to ground through a cathode bias resistor 29 by-passed by a condenser 31. The screen grid is connected to ground through a by-pass condenser 32 and a voltage divider resistor 33 and to plus B through a second voltage divider resistor 34.

The output of the limiter may be through a transformer 35 whose primary is connected to the plate of the tube 11 and to the plus B source through a plate dropping resistor 36. A plate by-pass condenser 37 is connected at the low end of the dropping resistor.

According to one of the important features of the invention the windings 18 and 19 are tuned to different frequencies. At high frequencies the windings may be formed to be tuned by their own distributed capacitance, the circuit capacitances and the tube capacitance, although separate tuning condensers could be used if desired. Preferably the winding 18 is tuned to a frequency above the center of the desired frequency band and the winding 19 is tuned to a frequency below the center. The tuning and coupling are set to determine the desired band-pass and to make the system uncritical to tube and component changes.

To provide flat response throughout the desired band, series and shunt damping is applied to the windings 18 and 19. This damping of the circuit also renders the same relatively uncritical to tube and component changes. The series resistors 21 and 25 are relatively small and may be on the order of 39 ohms while the shunt resistors 23 and 28 are larger, on the order of 10,000 ohms for the frequency ranges mentioned above. The shunt resistors reduce the peaks of the response curve while the series resistors act as decoupling elements to further cut down the peaks to produce the desired constant voltage characteristics, and furnish heavy damping on the windings to prevent overshoots at the ends of the band. The series resistors act to limit or cut down the peaks, with the series resistor 21 reducing the voltage across the primary winding 18 resulting from strong signals, and the series resistor 25 between the secondary winding and the grid of tube 11 reducing the voltage at the grid.

In operation, limiting is accomplished by driving the tubes to plate saturation and to cut off. Due to the type of coupling between the tubes and the characteristics of the pentode tubes, the tubes appear as constant voltage sources. This produces a very desirable limiter action with a flat response throught the selected frequency range. The first stage provides partial limiting with the output rising somewhat with the applied signal. The second stage further limits to provide a characteristic almost completely constant over the desired frequency band.

Figure 2:
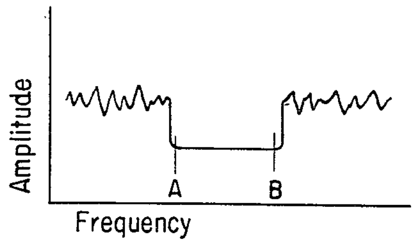
Figure 2 is a graph indicating the operation of the circuit.

Figure 2 indicates a typical operation of the circuit. As shown, the selected frequency range is between the points A and B. Below the point A and above the point B the limiter is ineffective but at the critical points the amplitude drops sharply to the limiter level and is maintained constant throughout the full range. I have found that changes in amplitude above the limiter level do not affect the level but merely increase the band width slightly. Thus the action is substantially independent of amplitude of the signal as long as it is above the limiter level.

While one specific circuit embodying the invention has been shown and described it will be understood that this is illustrative only and is not to be taken as a definition of the scope of the invention, reference being had for this purpose to the appended claims.

What is claimed is:

1. A limiter circuit for translating a desired frequency band including in combination, first and second electron discharge valves of the pentode type including control grids and anodes, an input circuit connected to the control grid of said first valve, circuit means for coupling said first valve to said second valve including a coupling transformer having inductively coupled primary and secondary windings, a first direct current conductive circuit including a first resistor and said primary winding connected in series from a potential source to the anode of said first valve, a second direct current conductive circuit including a second resistor and said secondary winding connected in series from a reference potential to said control grid of said second valve, and an output circuit coupled to said anode of said second valve, one of said windings of said coupling transformer being tuned to a frequency below the center of the desired frequency band and the other of said windings being tuned to a frequency above the center of said band, the tuning of said windings producing rising departures from a uniform amplitude response at the margins of said frequency band, said primary winding and said first resistor in series forming a voltage divider so that only a portion of the signal voltage at said anode of said first valve is applied across said primary winding, said second resistor forming the sole path for current through said secondary winding for limiting current flow therethrough, said resistors having values so selected to substantially offset said departures at said margins of said band for reducing amplitude variations in the response in said output circuit over said frequency band.

2. A limiter circuit for translating a desired frequency band including in combination, first and second electron discharge valves of the pentode type including control grids and anodes, an input circuit connected to the control grid of said first valve, circuit means for coupling said first valve to said second valve including a coupling transformer having inductively coupled primary and secondary windings, a first direct current conductive circuit including a first resistor and said primary winding connected in series from a potential source to the anode of said first valve, said first circuit including a second resistor connected in shunt across said first resistor and said primary winding, a second direct current conductive circuit including a third resistor and said secondary winding connected in series from a reference potential to said control grid of said second valve, said second circuit including a fourth resistor connected in shunt across said third resistor and said secondary winding, and an output circuit coupled to said anode of said second valve, one of said windings of said coupling transformer being tuned to a frequency below the center of the desired frequency band and the other of said windings being tuned to a frequency above the center of said band, the tuning of said windings producing rising departures from a uniform amplitude response at the margins of said frequency band, said primary winding and said first resistor in series forming a voltage divider so that only a portion of the signal voltage at said anode of said first valve is applied across said primary winding, said third resistor forming the sole path for current through said secondary winding for limiting current flow therethrough, said resistors having values so selected to substantially offset said departures at said margins of said band for reducing amplitude variations in the response in said output circuit over said frequency band.

References Cited in the file of this patent

UNITED STATES PATENTS

| | | |
|---|---|---|
| 2,105,538 | Landon | Jan. 18, 1938 |
| 2,122,653 | Levy | July 5, 1938 |
| 2,131,193 | Schlesinger | Sept. 27, 1938 |
| 2,216,998 | Farrington | Oct. 8, 1940 |
| 2,261,374 | Koch | Nov. 4, 1941 |
| 2,270,539 | Malling | Jan. 20, 1942 |
| 2,272,589 | Steinmetz | Feb. 10, 1942 |
| 2,291,277 | Case | July 28, 1942 |
| 2,293,384 | De Cola | Aug. 18, 1942 |
| 2,295,323 | Armstrong | Sept. 8, 1942 |
| 2,399,091 | Bingley et al. | Apr. 23, 1946 |
| 2,534,060 | Roberts | Dec. 12, 1950 |

OTHER REFERENCES

Terman text, "Radio Engineering," 3rd ed., pages 339, 352 and 356–358, publ. 1947 by McGraw-Hill Book Co., New York city.